(12) United States Patent
Wheatley

(10) Patent No.: US 7,037,057 B1
(45) Date of Patent: May 2, 2006

(54) UNIVERSAL VEHICLE TIE-DOWN RAILS

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 10/714,040

(22) Filed: Nov. 17, 2003

(51) Int. Cl.
 *B60P 7/08* (2006.01)
(52) U.S. Cl. ........................ 410/106; 410/101
(58) Field of Classification Search .......... 410/101, 410/106, 108, 110, 115, 116; 296/32, 36, 296/41, 43; 248/499
 See application file for complete search history.

(56) References Cited

U.S. PATENT DOCUMENTS

| | | | |
|---|---|---|---|
| 4,604,013 A * | 8/1986 | Elwell et al. | 410/106 |
| 4,650,382 A * | 3/1987 | Johnson | 410/110 |
| 5,476,349 A | 12/1995 | Okland | |
| 5,642,971 A * | 7/1997 | Ragsdale | 410/106 |
| 5,827,024 A | 10/1998 | Davenport | |
| 5,873,688 A * | 2/1999 | Wheatley | 410/106 |
| 5,904,458 A | 5/1999 | Bundy | |
| 5,997,227 A * | 12/1999 | Bundy | 410/106 |
| 6,146,069 A * | 11/2000 | Elwell et al. | 410/106 |
| 6,176,658 B1 | 1/2001 | Rowe | |
| 6,312,202 B1 * | 11/2001 | Benedict | 410/116 |
| 6,827,532 B1 * | 12/2004 | Nix | 410/106 |

\* cited by examiner

*Primary Examiner*—Stephen Gordon
(74) *Attorney, Agent, or Firm*—Alex Rhodes

(57) ABSTRACT

A pair of easy to install universal cargo tie-down rails for mounting on a variety of station wagon or van roof panels and on pick-up truck cargo boxes. Each of the tie-down rails is comprised of a pair of end brackets, at least one intermediate bracket, a cylindrical thin wall tube and small fasteners in each of the brackets for clamping the brackets on the thin wall tube. Each of the brackets is slidably mounted on the thin wall tube and free to rotate about the axis of the cylindrical tube before the bracket is clamped to the tube. In an alternate embodiment, the ends of the tube are closed with pressed in place covers.

7 Claims, 3 Drawing Sheets

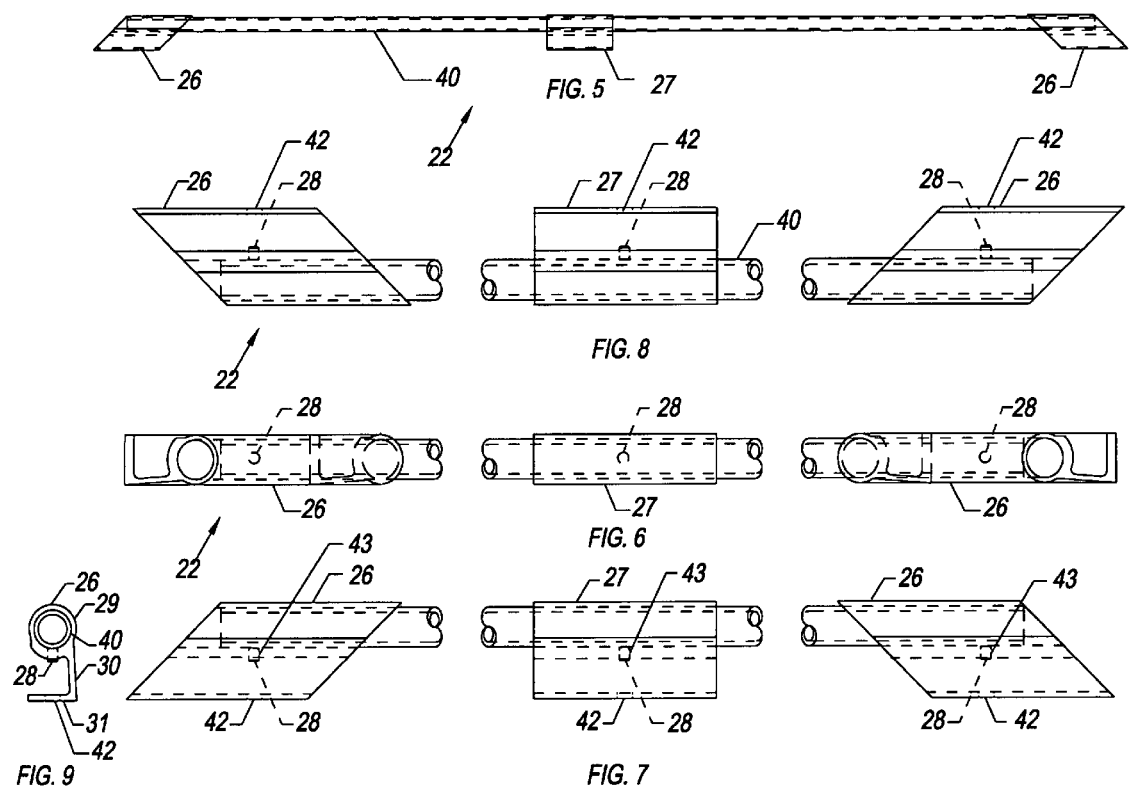

UNIVERSAL VEHICLE TIE-DOWN RAILS

FIELD OF THE INVENTION

This invention relates to tie-down rails and more particularly to a method and a pair of universal cargo tie-down rails for mounting on a variety of pick-up trucks, station wagons and vans.

BACKGROUND OF THE INVENTION

Tie-down rails are used with ropes, straps and bungee cords to constrain cargo on pick-up truck cargo boxes, station wagon roofs and van roof. Tie-down rails known in the art suffer from a number of disadvantages, such as manufacturing equipment investment costs, high inventory (parts in process and finished parts) costs, difficult-to-install procedures, and poor structural integrity. Many tie-down rails apply only to a single vehicle brand or model, requiring a manufacturer to maintain a large inventory of tie-down rails. This results in higher retail prices and/or reduced profits.

Some pick-up trucks have stake holes in cargo boxes for stakes that attach wooden rails. Although stakes and wooden rails are very seldom used, stake holes are convenient for attaching tie-down rails. Okland U.S. Pat. No. 5,476,349; Davenport U.S. Pat. No. 5,827,024; Bundy U.S. Pat. No. 5,904,458 and Rowe U.S. Pat. No. 6,176,658 are exemplary of pick-up truck rails in the prior art. Okland U.S. Pat. No. 5,476,349 discloses a pair of fixed length tubular tie-down rails with separate die cast ends mounted in stake holes. The die cast parts require expensive molds and fixed length rails are specific to a single vehicle brand or model.

Davenport U.S. Pat. No. 5,827,024 discloses a pair of one-piece fixed length tubular tie-down rails with bent ends. The rails have low bending stiffness and are applied to a single vehicle brand or model. Bundy U.S. Pat. No. 5,904,458 discloses a pair of rails mounted in drilled holes of a pick-up truck box. Rowe U.S. Pat. No. 6,176,658 discloses fixed length tie down rails bolted or welded to a pick-up truck box.

SUMMARY OF THE INVENTION

The present invention provides important benefits over the relevant prior art. One benefit of the invention is that it reduces investment costs for tools. Another advantage is that it is easy to install and does not require shims or flexible mountings to compensate for manufacturing tolerances. Another benefit is that it reduces the costs of inventories of parts in process and finished parts. Another benefit is that it allows common tie-down bars to be used for ranges of models and brands. Still yet another benefit is that it is applicable to station wagons, vans and pick-up trucks. Still yet another benefit is that it can be mounted in existing stake holes.

Each of the tie-down rails is comprised of a tube, a pair of opposite hand extruded end brackets, and a threaded fastener in each of the brackets for clamping the brackets to the tube. The brackets are slidably mounted and rotatable about an axis of the tube. The brackets are clamped to the tube after the tie-down rail is attached to a vehicle. The tie-down rails may also include one or more intermediate brackets to increase the tube's ending stiffness by reducing the span between mountings.

In employing the teaching of the present invention, a plurality of alternate constructions can be adopted to achieve the desired objects and capabilities. In this disclosure, one preferred embodiment is described. However, the disclosed embodiment is intended as an example only and should not be considered as limiting the scope of the invention.

Further objects, features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the following diagrammatic drawings illustrating a preferred embodiment by way of non-limiting example only.

FIG. 5 is an enlarged outer side view of one of the tie-down rails.

FIG. 6 is an enlarged fragmentary plan view of the tie-down rail.

FIG. 7. is an enlarged fragmentary outer side view of the tie-down rail.

FIG. 8 is an enlarged fragmentary inner side view of the tie-down rail.

FIG. 9. is an enlarged fragmentary end view of the tie-down rail.

DETAILED DESCRIPTION OF A PREFERRED EMBODIMENT

Figure 1:
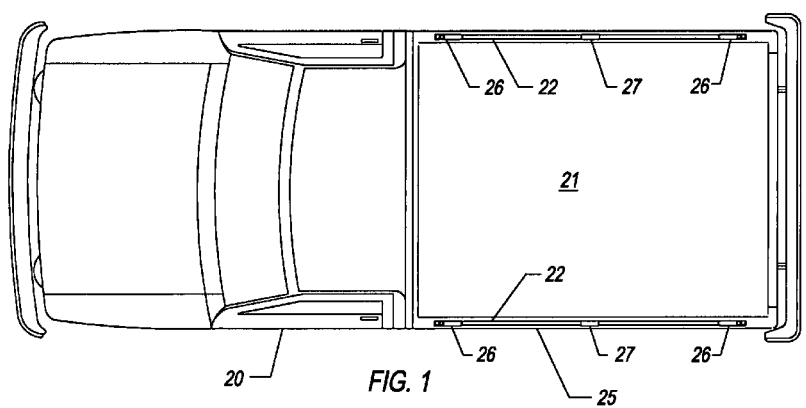
FIG. 1 is a plan view of a pick-up truck with a soft tonneau cover and a pair of tie-down rails mounted on a cargo box.
Figure 2:
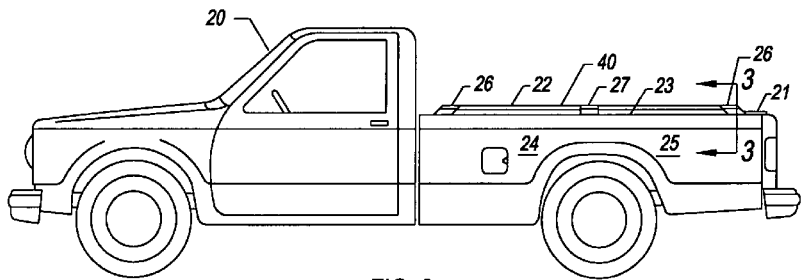
FIG. 2 is a side view of the pick-up truck, tonneau cover and tie-down rails.

Referring now to the drawings wherein like numerals designate like and corresponding parts throughout the several views, in FIGS. 1 and 2 are shown, by way of illustrating the invention, a pick-up truck 20 with a tonneau cover 21 and a pair of tie-down rails 22 mounted on a cargo box 25 according to the present invention, it being understood that the tie-down rails 22 can be applied to other vehicles, for example, the roof panels of station wagons and vans. As shown in FIGS. 1 and 2, the tie-down rails 22 are mounted on top ledges 23 of the side panels 24 of the pick-up truck 20 along opposite sides of the tonneau cover 21.

The rails 22 are identical, each being comprised of a pair of end brackets 26, an intermediate bracket 27, a thin wall tube 40 and small socket head fasteners 28 in the brackets 26,27 for clamping the brackets 26, 27 to the thin wall tube 40. The intermediate bracket 27 is optional and is used when necessary to reduce bending stresses in the tube 40. In cases where the span between the end brackets is exceptionally large, more than one intermediate bracket can be used.

One feature of the invention is that the brackets 26, 27 are made from a common aluminum extrusion by simply cutting the extrusion to form the brackets 26, 27 as shown in the drawings. The aluminum extrusion provides several important benefits. One benefit is that extrusion dies are relatively low in cost and suitable for high production volumes. Another benefit is that an aluminum extrusion can be painted, plated or anodized to provide attractive finishes and corrosion protection.

Another benefit is that only a single aluminum extrusion die is required to produce the brackets 26, 27. As previously noted, the brackets 26, 27 are slidably mounted on the thin wall tube 40 and free to rotate about an axis of the tube 40 before they are clamped to the tube 40. This feature provides several benefits beyond the benefit of compensating for vehicle manufacturing tolerances. One benefit is that the brackets 26, 27 can be moved along on the thin wall tube 40 to align the brackets 26, 27 with existing holes, such as the stake holes 32 in of the pick-up truck box 25. A still further benefit is the ability to add intermediate brackets 27 to reduce bending stresses in the thin wall tube 40.

Referring now to FIG. 9, each of the brackets 26, 27 is comprised of a circular thin wall upper portion 29, an adjoining downward extending substantially vertical wall portion 30 and an adjoining inward extending lower flange portion 31. A lower portion of the circular portion 29 is thicker to provide adequate stock for the clamping fastener 28. Holes 42 are provided in the bases 31 for attaching the brackets 26, 27 to the cargo box 25. The holes 42 are aligned with tapped holes 43 which engage the clamping fasteners 28.

Figure 3:
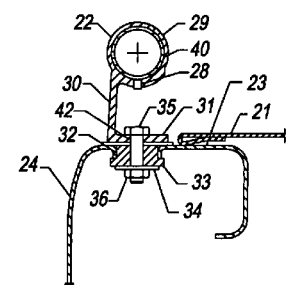
FIG. 3 is an enlarged cross-sectional view taken on the line 3—3 in FIG. 2.
Figure 4:
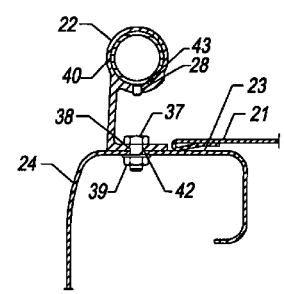
FIG. 4 is an enlarged cross-sectional view of an alternate embodiment taken in the same manner as FIG. 3.

Alternate methods for attaching the rails 22 to the cargo box side panels 24 are shown in FIGS. 3 and 4. In the first method, shown in FIG. 3, the lower flange portions 31 are attached to stake holes 32 in the upper ledges 23 of the side panels 24 with rubber bushings 33, flat washers 34, bolts 35 and nuts 36. When the bolts 35 are tightened, the rubber bushings 33 expand diametrically to secure the bolts 35 to the side panels 24. In the second method, shown in FIG. 4, the lower flange portions 31 are secured to the side panels 24 with bolts 37 that extend through holes 38 and nuts 39.

Figure 10:
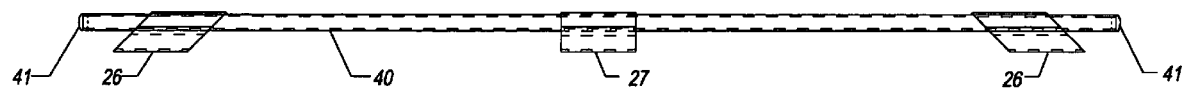
FIG. 10 is an enlarged outer side of an alternate embodiment.
Figure 11:
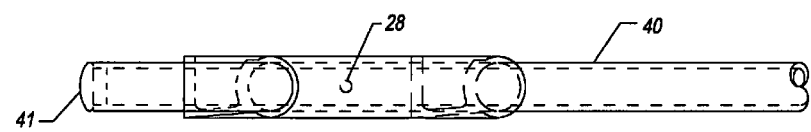
FIG. 11 is an enlarged plan view of an end portion of the alternate embodiment.
Figure 12:
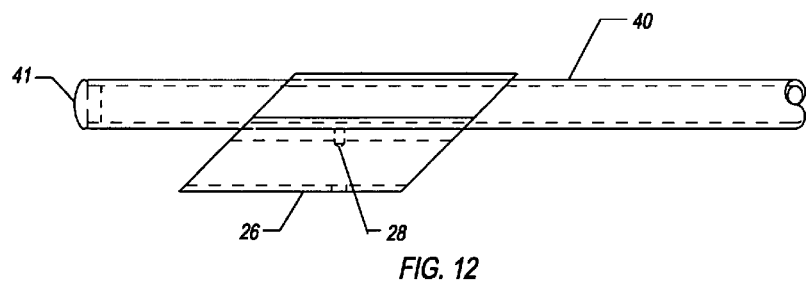
FIG. 12 is an enlarged outer side view of an end portion of the alternate embodiment

In FIGS. 10 through 12, inclusive, an alternate embodiment is shown wherein the end brackets 26 are offset inwardly from the ends of the tube 40 and the end portions of the thin wall tube 40 are covered with caps 41. This embodiment is used for adapting common tie-down rails 22 to existing vehicle holes or to a range of vehicle brands and models.

The method of making the subject invention is comprised of the following steps. An aluminum extrusion blank (not shown) is formed in the usual manner by extruding an aluminum billet through a die. The brackets 26, 27 are cut from the extrusion blank. The holes 42 and 43 are drilled and the hole 43 tapped in brackets 26, 27 for the clamping screw 28 and attaching the brackets 26, 27 to the vehicle 20. The brackets 26, 27 are finish coated by painting, plating, anodizing or another suitable process. The socket head clamping screw 28 is threadably engaged with the tapped holes 43 in each of the brackets 26, 27. The thin wall tube 40 having an outside diameter which closely fits brackets 26, 27 is cut from a longer tube to a specified length. The brackets 26, 27 are assembled to the tube 40. The tube 40 may also be cut by a purchaser of the rails 22.

The invention being thus described, it will be obvious that my invention provides numerous benefits over the prior art. Inter alia, the investment costs are low, the installation is easy, the mounting brackets are self-aligning and a single extrusion die can be used for fitting my invention to a wide range of vehicle brands and models. It will be further obvious that although many variations of my invention are possible, such variations are not to be regarded as a departure from the spirit and scope of the invention, and all such modifications as would be obvious to one skilled in the art are intended to be included in the scope of the following claims.

I claim:

1. A universal tie-down rail for securing cargo in a vehicle comprising a cylindrical tube; at least one pair of single piece brackets having uniform cross sections, each of said brackets having an upper circular thin wall portion, an adjoining downward extending substantially vertical wall portion and an adjoining lower base portion and being slidably positional along a length of said tube and rotatable about an axis of said tube; and a means in each of said brackets for fixing said brackets to said tube.

2. The universal tie-down rail recited in claim 1 further comprising at least one additional bracket between said pair of brackets for reducing bending stresses in said tube.

3. The universal tie-down rail recited in claim 1 wherein said vehicle is a pick-up truck.

4. The universal tie-down rail recited in claim 1 wherein said vehicle is a van.

5. The universal tie-down rail recited in claim 1 wherein said vehicle is a station wagon.

6. The universal tie-down rail recited in claim 1 further comprising a single aperture in said lower portion of each of said brackets for mounting of said rail on said vehicle.

7. The universal tie-down rail recited in claim 1 further comprising at least one additional bracket for mounting said rail on said vehicle.

* * * * *